US006467711B2

(12) United States Patent
Michel

(10) Patent No.: US 6,467,711 B2
(45) Date of Patent: Oct. 22, 2002

(54) CHOPPER

(75) Inventor: Walter Michel, Münchenbuchsee (CH)

(73) Assignee: Moha Moderne Haushaltwaren AG, Zollikofen (CH)

(*) Notice: Subject to any disclaimer, the term of this patent is extended or adjusted under 35 U.S.C. 154(b) by 0 days.

(21) Appl. No.: 09/780,491

(22) Filed: Feb. 9, 2001

(65) Prior Publication Data

US 2001/0028007 A1 Oct. 11, 2001

(30) Foreign Application Priority Data

Feb. 10, 2000 (CH) .............................................. 271/00

(51) Int. Cl.[7] ................................................ A47J 43/04
(52) U.S. Cl. ....................................... 241/169; 241/272
(58) Field of Search ............................. 241/169, 169.1, 241/272

(56) References Cited

U.S. PATENT DOCUMENTS

| | | | | |
|---|---|---|---|---|
| 4,771,954 A | * | 9/1988 | Poncy | 241/169.1 |
| 4,967,970 A | | 11/1990 | Michel | |
| 6,142,399 A | * | 11/2000 | Huang | 241/169.1 |

FOREIGN PATENT DOCUMENTS

| | | |
|---|---|---|
| CH | 390 479 | 4/1965 |
| EP | 345 223 | 12/1989 |
| EP | 345 223 | 11/1994 |
| FR | 2 448 333 | 9/1980 |
| GB | 821493 | 10/1959 |
| GB | 2 287 174 | 9/1995 |
| GB | 2 293 753 | 4/1996 |

* cited by examiner

*Primary Examiner*—Mark Rosenbaum
(74) *Attorney, Agent, or Firm*—Pauley Petersen Kinne & Erickson

(57) ABSTRACT

A device for the size reduction of foodstuffs, such as onions and the like, with a housing which may be turned over the goods to be reduced in size. A knife is displaceable downwards against a force of a spring by an actuation mechanism with a push button and a plunger. The knife with the upwards movement by the guiding in the housing is rotated about an angle and by way of a positive displacement the rotation of the actuation mechanism relative to the housing is limited in one direction. The actuation mechanism includes a cap open at the bottom in which the push button is rotatably mounted, wherein the push button and the cap in the axial direction are rigidly connected to one another. An outer shaping of the actuation mechanism is completely free with the application of the cap.

9 Claims, 3 Drawing Sheets

CHOPPER

BACKGROUND OF THE INVENTION

1. Field of the Invention

This invention relates to a chopper having a housing with a plunger and a knife for onions, other vegetables and other foodstuffs.

2. Description of Related Art

Choppers are known from European Patent Reference EP-B-0345223. Known choppers have a housing which may be turned over the goods to be chopped, and a knife introduced in the housing, which is displaceable against the force of a spring by an actuation mechanism with a push button and a plunger. The knife may be displaced downwards against the force of the spring and with the subsequent movement upwards through a guide in the housing is rotated about a certain angle relative to the housing. A displacement mechanism arranged between the actuation mechanism and the housing ensures a positive displacement of the knife. This positive displacement has proven to be very advantageous because it prevents the knife from "chopping on the spot". With this the effectiveness of the chopper is increased and the uniform size distribution of the goods to be chopped is improved.

If the push button is pressed downwards by hand, a lower part of a coupling is rotated within an inside of the housing by way of spiral grooves. Because the push button is rigidly held by the actuating hand and may not rotate, an upper coupling part is rotated relative to the lower coupling part. After releasing, such as with an upwards movement of the plunger and of the push button, with the displacement mechanism a mutual rotation of the two coupling parts is no longer possible. As a result of the positive rotation of the first coupling part by way of the spiral-shaped grooves also the head, the plunger and thus the knife is rotated. In the embodiment shown in European Patent Reference EP-B-0345233 each rotation is 22.5 degrees, and after sixteen actuations a complete revolution is achieved.

A chopper according to Great Britain Patent Reference GB-A-821,493 differs from the previously mentioned chopper because it has a different displacement mechanism.

With known choppers the necessary radial rotational movability and the necessary vertical upwards and downwards movability of the actuation mechanism is achieved by its circular cylindrical outer shape.

Vegetable choppers of this form are commercially available. The actuation mechanism not only represents a significant functional part but also very decisively characterizes the outer appearance of the apparatus. With the known choppers it is not possible for the manufacturer to decisively change the outer shape of the actuation mechanism although this would be desirable for styling and ergonomic reasons.

With choppers with a positive displacement mechanism, such as for example as known from European Patent Reference EP-B-0345223 the actuation mechanism, as previously described, on chopping may not be firmly held by the user but must be released during the upwards movement in order to permit relative rotation of the actuation mechanism. A continuous holding firm of the actuation mechanism on chopping prevents the displacement and may even lead to blocking or damaging of the displacement mechanism. Erroneous operation has been somewhat avoided by displaying operating instructions on the packages of the known choppers in which the user is shown a correct usage. The instructions are often overlooked or are not observed so that erroneous operations do occur.

SUMMARY OF THE INVENTION

It is one object of this invention to provide a chopper which alleviates these disadvantages.

According to this invention, there is a chopper with an actuating mechanism which in addition to the known elements has an outer cap in which a push button is held in a rotatably movable manner. The cap, which is held by the user on chopping, may thus have a shape deviating from the circular shape, by which aesthetic as well as ergonomic demands on the shaping style may be achieved. The type of mounting according to this invention permits the decoupling of the rotational movement occurring with positive displacement from the cap.

BRIEF DESCRIPTION OF THE DRAWINGS

In the following specification, the accompanying drawings show and describe different embodiments of this invention, wherein.

DESCRIPTION OF PREFERRED EMBODIMENTS

Figure 1:
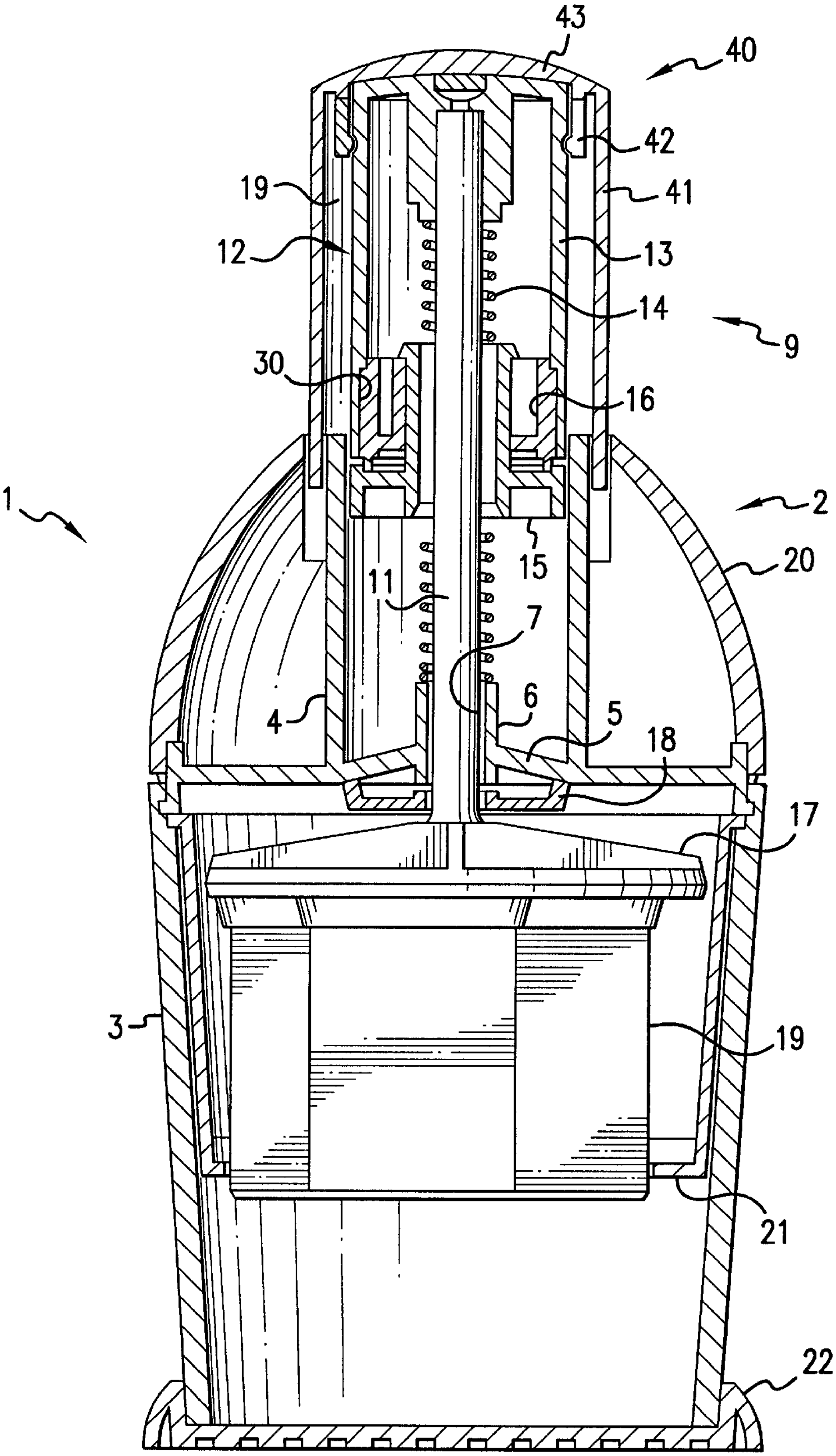
FIG. 1 is a sectional view of a device according to this invention.

As shown in FIG. 1, a chopper according to this invention comprises a housing 1 with an upper part 2 and a lower part 3. The lower part 3 is connected to the upper part 2 with a bayonet joint or a similar connection. The housing upper part 2 comprises a housing outer wall 20, a cylindrical insert 4 open to the top and a base 5 connected to the insert 4 as one piece. The base 5 has an opening 7 surrounded by a cylindrical projection 6. On an inner surface the cylindrical wall of the insert 4 comprises grooves routed in a spiral-shaped manner. The chamber 4 formed from the cylindrical wall accommodates the rotationally movable parts of the actuation mechanism 9.

The actuation mechanism 9 comprises a plunger 11 guided in the opening 7 of the chamber base 5. The plunger 11 is rigidly connected to a push button 12 which below comprises a cylindrical extension 13 with an outer diameter that corresponds to the inner diameter of the insert chamber. The push button 12 is thus guided in the chamber.

Between the chamber base 5 and the push button 12 there is located a helical spring 14 which pushes the push button 12 together with the plunger 11 upwards.

Furthermore, the actuation mechanism comprises a cap 40 positioned over the push button 12. The side walls 41 of the cap 40 are distanced from the cylindrical extension 13 of the push button and thus form a receiving space 19. If the actuation mechanism, shown in FIG. 1, is located in an upper idle position then an upper region of the cylindrical insert 4 lies in the receiving space. If the actuation mechanism is pushed downwards the cylindrical insert 4 penetrates upwards into the receiving space 19.

The cap 40, as shown in FIG. 1, is rectangular in cross section. Accordingly, in the housing upper part 20 there is a rectangular opening 21 so that in the assembled condition the housing upper part 2 passes through by the cap 4 and the further inner-lying parts of the actuation mechanism.

FIG. 1 shows that the cylindrical push button 12 in an upper region is held in the cap 40 in a rotationally movable manner. In a preferred embodiment, as shown in FIG. 1, a cap lid 43 for holding the push button 12 has tongues 42 projecting downwards. The tongues 42 have an inner annular groove 44 into which a corresponding annular bead on the outer wall of the push button 12 may engage.

FIG. 1 shows a further embodiment of the chopper according to this invention wherein the push button 12 has an annular groove and the tongues 42 have corresponding beads. On construction of the chopper the cap 40 is simply pushed over the push button 12 so far, until the beads latch into the annular groove. The push button 12 is thus held in the cap 40 in a rotationally movable manner about an apparatus main axis A without a possible movement of the two parts relative to one another in a vertical direction.

Figure 3A:
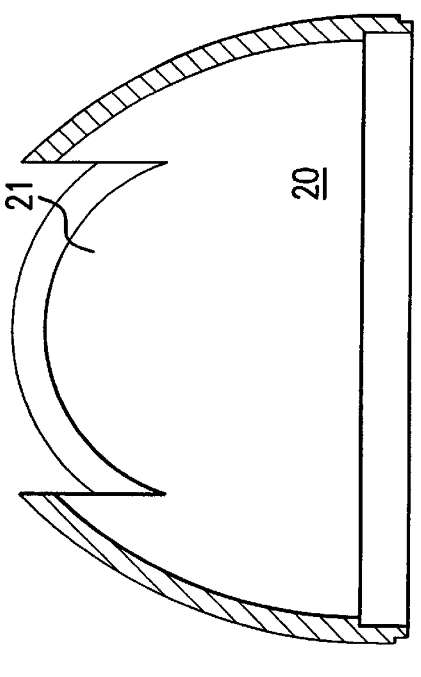
FIG. 3*a* shows a longitudinal section taken through a housing upper part fitting with the cap shown in FIG. 2.
Figure 3B:
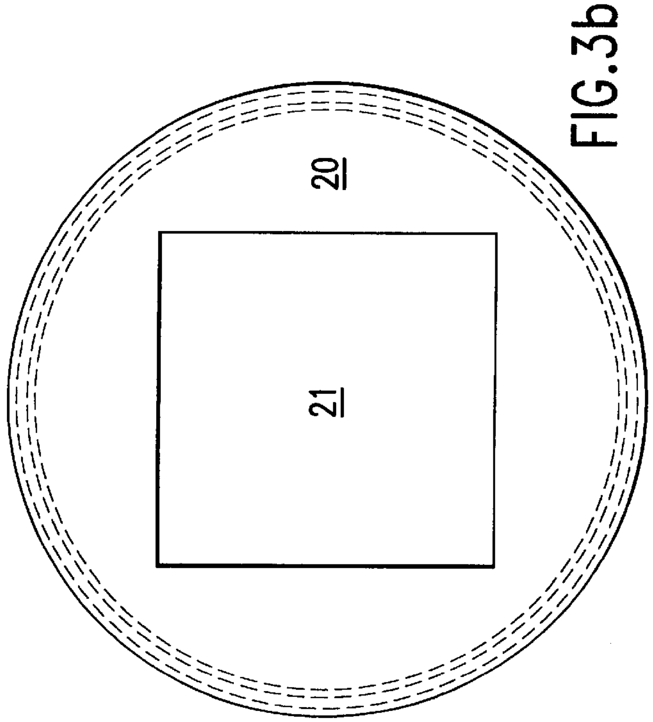
FIG. 3*b* shows a plan view of a housing upper part shown in FIG. 3*a;*
Figure 2A:
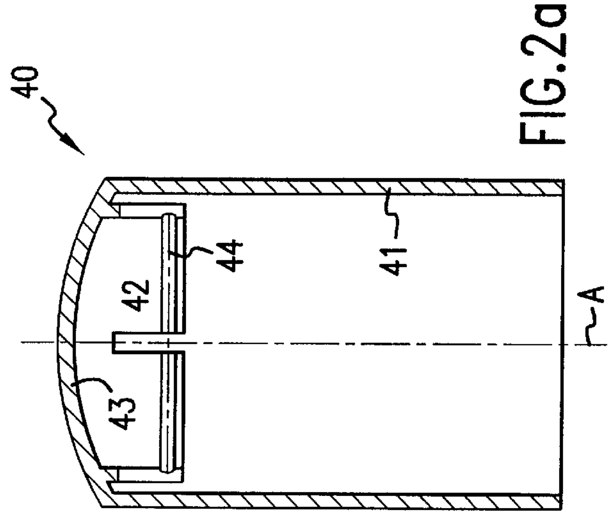
FIG. 2*a* shows a longitudinal section taken through a cap according to a further embodiment of this invention.
Figure 2B:
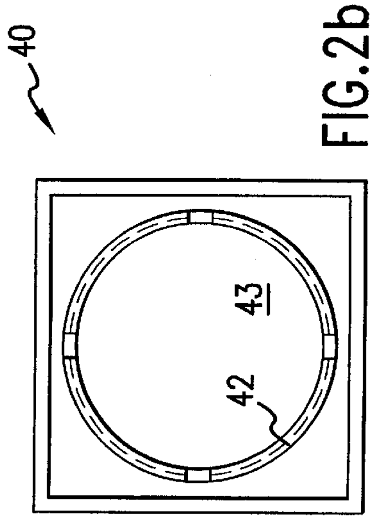
FIG. 2*b* shows a cross section taken through the cap shown in FIG. 2*a;*
Figure 4A:
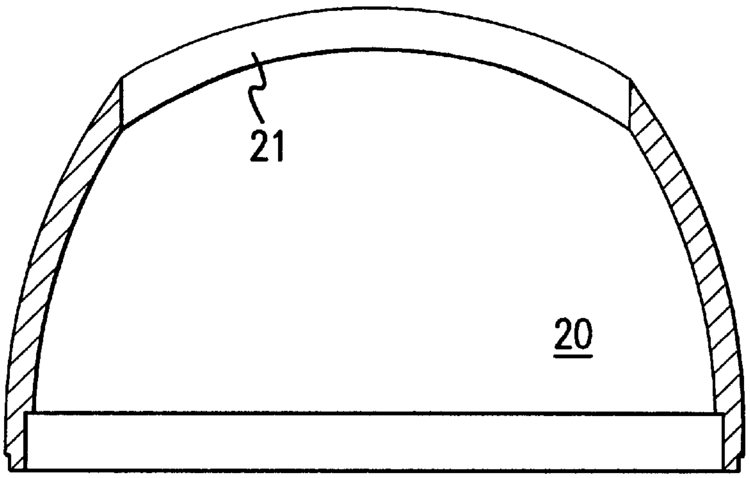
FIG. 4*a* shows a longitudinal section taken through a housing upper part according to a further embodiment of this invention.
Figure 4B:
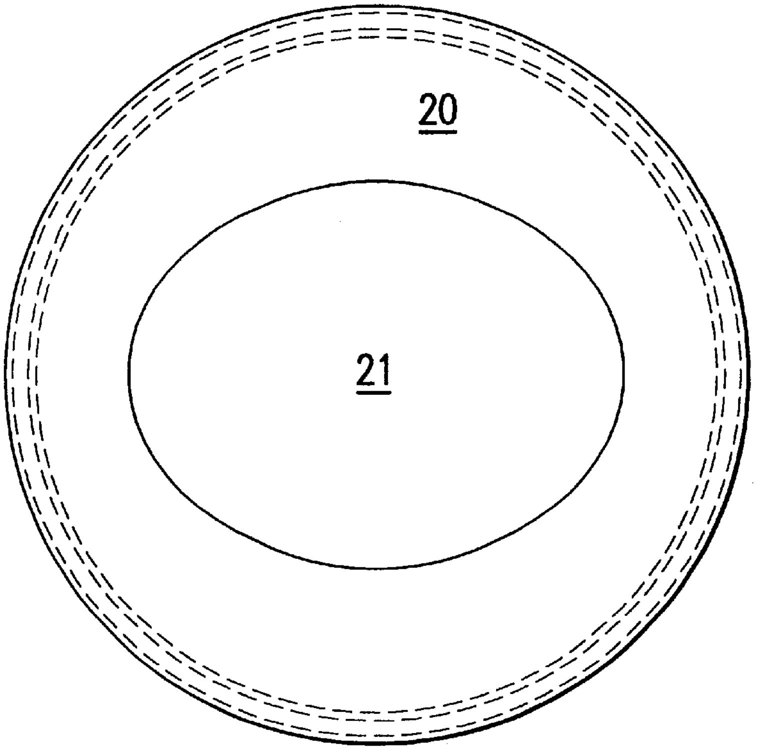
FIG. 4*b* shows a plan view of a housing upper part shown in FIG. 4*a*.

This type of mounting of the push button 12 in the cap 40 permits the use of caps with any cross sectional shape. Apart from the rectangular and square cross sections shown in the FIGS. 2*a*, 2*b* and 3*b*, triangular, star-shaped, heart-shaped or completely irregular cross sectional shapes may be selected. The freedom with regard to the shaping is only limited to an extent that the cap 40 must accommodate the push button 12 and the cylindrical insert 4.

On the underside of the cylindrical extension 13 of the push button 12 there is a two-part coupling 15, 16 which forms the core piece of the positive displacement mechanism.

On the lower end of the plunger there is fastened a knife holder 17. Between the knife holder 17 and the chamber base there is positioned a shock-absorber 18. In the knife holder 17 there is fastened a chopping knife 19, known to those skilled in the art, which is shaped in a waved manner.

A scraper 21, which on disassembling the housing into an upper part and lower part, may likewise be removed which considerably simplifies the cleaning process. Finally, on a lower side of the housing lower part 3 there is located a chopping plate 22 onto which the housing is placed.

The exact design and function of the coupling is known from European Patent Reference EP-B-0345223. The coupling has a cylindrical outer wall with two axis-parallel projections lying opposite to one another. These projections serve the insertion of the second coupling part 16 into corresponding grooves 30 in the inner wall of the extension of the push button 12.

The cap 40 on use of the chopper 1 does not execute a rotational movement relative to the housing upper part 2. It may therefore be continuously rigidly held by the user without a negative effect on the function of the displacement mechanism with the downwards movement as well as with the upwards movement. An operational error when chopping is minimized.

What is claimed is:

1. In a device for size reduction of foodstuffs, with a housing (1-3) which may be turned over the foodstuffs to be reduced in size and with a knife (19) displaceable downwards against a force of a spring (14) by an actuation mechanism (9) with a push button (12) and a plunger (11), the knife (19) with an upwards movement by a guiding in the housing (1-3) is rotated about an angle, with a positive displacement (15, 16) so that the actuation mechanism (9) is rotatable relative to the housing (1-3) in one direction, the improvement comprising: the actuation mechanism (9) having a cap (40) and the push button (12) rotatably mounted in the cap (40) which is open at a bottom, wherein the push button (12) and the cap (40) in an axial direction are rigidly connected to one another.

2. In the device according to claim 1, wherein the push button (12) comprises a plurality of cylindrical extensions (13) and a plurality of side walls (41) of the cap (40) are distanced from the extensions (13) of the push button (12) and define a receiving space (19) for receiving a cylindrical insert (4).

3. In the device according to claim 2, wherein the cap (40) has a cross sectional surface deviating from the circular shape.

4. In the device according to claim 3, wherein the cap (40) in cross section is one of triangular, polygonal, elliptical, oval, star-shaped and heart-shaped.

5. In the device according to claim 4, wherein the actuation mechanism (9) passes through an opening (21) in a housing upper part (20), wherein a shape of the opening (21) is adapted to a cross sectional shape of the cap (40).

6. In the device according to claim 1, wherein an upper region of the push button (12) has a circumferential outer annular groove (44) into which corresponding beads of downwardly projecting tongues (42) of the cap (40) engage, and hold the push button (12) in the cap (40) in a rotationally movable manner.

7. In the device according to claim 1, wherein the cap (40) has a cross sectional surface deviating from a circular shape.

8. In the device according to claim 7, wherein the cap (40) in cross section is one of triangular, polygonal, elliptical, oval, star-shaped and heart-shaped.

9. In the device according to claim 1, wherein the actuation mechanism (9) passes through an opening (21) in a housing upper part (20), wherein a shape of the opening (21) is adapted to a cross sectional shape of the cap (40).

* * * * *